US009532366B2

(12) United States Patent
Manssour (10) Patent No.: US 9,532,366 B2
(45) Date of Patent: Dec. 27, 2016

(54) METHOD AND NODE FOR SCHEDULING IN A WIRELESS COMMUNICATIONS NETWORK (75) Inventor: Jawad Manssour, Seoul (KR)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 381 days.

(21) Appl. No.: 14/125,430

(22) PCT Filed: Jun. 15, 2011

(86) PCT No.: PCT/SE2011/050741
§ 371 (c)(1),
(2), (4) Date: Dec. 11, 2013

(87) PCT Pub. No.: WO2012/173535
PCT Pub. Date: Dec. 20, 2012

(65) Prior Publication Data
US 2014/0112284 A1 Apr. 24, 2014

(51) Int. Cl.
H04W 4/00 (2009.01)
H04W 72/08 (2009.01)
(Continued)

(52) U.S. Cl.
CPC ......... H04W 72/085 (2013.01); H04B 7/0689 (2013.01); H04L 1/0027 (2013.01);
(Continued)

(58) Field of Classification Search
CPC .......... H04W 72/085; H04W 72/1231; H04W 72/1247; H04B 7/0689; H04B 7/0417; H04B 7/063; H04B 7/0639; H04B 7/0656; H04B 7/0697; H04L 1/0027; H04L 5/0057
(Continued)

(56) References Cited

U.S. PATENT DOCUMENTS

2008/0227495 A1* 9/2008 Kotecha ............... H04B 7/0417
455/562.1
2010/0091712 A1* 4/2010 Lu ..................... H04W 74/0866
370/328

FOREIGN PATENT DOCUMENTS

CA 2442901 A1 9/2003
EP 1841276 A2 10/2007
(Continued)

OTHER PUBLICATIONS

UK Patent Publication, GB 2453979 A, to Motorola, Apr. 29, 2009.*
(Continued)

Primary Examiner — Peter Cheng
(74) Attorney, Agent, or Firm — Patents on Demand, P.A.; Brian K. Buchheit; Scott M. Garrett (57) ABSTRACT The present disclosure relates to scheduling of radio resources by a radio network node to a UE located in a wireless communications network. The UE is being served by the network node and is determined to have enough priority The present disclosure relates scheduling of radio resources by a radio network node to a UE located in a wireless communications network. The UE is being served by the network node and is determined to have enough priority weight for being scheduled in downlink. UE Channel State Information (CSI) is retrieved and a determination is made whether the retrieved CSI is unreliable, and when unreliable, retrieving a Scheduling Delay Time (SDT) representing a time for which the network node is allowed to delay a scheduling of radio resources to the UE. A determination is then made whether an updated CSI is due to be reported during the retrieved SDT, and, radio resources to the UE are scheduled based on a result from the determination whether an updated CSI is due to be reported during the retrieved SDT weight for being scheduled in downlink. UE Channel State Information (CSI) is retrieved and a (Continued)

determination is made whether the retrieved CSI is unreliable, and when unreliable, retrieving a Scheduling Delay Time (SDT) representing a time for which the network node is allowed to delay a scheduling of radio resources to the UE. A determination is then made whether an updated CSI is due to be reported during the retrieved SDT, and, radio resources to the UE are scheduled based on a result from the determination whether an updated CSI is due to be reported during the retrieved SDT.

16 Claims, 5 Drawing Sheets

(51) Int. Cl.
  *H04L 1/00*  (2006.01)
  *H04L 5/00*  (2006.01)
  *H04W 72/12* (2009.01)
  *H04B 7/06*  (2006.01)
  *H04B 7/04*  (2006.01)
(52) U.S. Cl.
  CPC ....... *H04L 5/0057* (2013.01); *H04W 72/1231* (2013.01); *H04B 7/0417* (2013.01); *H04B 7/063* (2013.01); *H04B 7/0639* (2013.01); *H04B 7/0656* (2013.01); *H04B 7/0697* (2013.01); *H04W 72/1247* (2013.01)
(58) Field of Classification Search
  USPC ........................................................ 370/329
  See application file for complete search history.

(56) References Cited

FOREIGN PATENT DOCUMENTS

GB        2453979 A         4/2009
WO   WO 2007053106 A1      5/2007
WO   WO 2010/120217 A1    10/2010

OTHER PUBLICATIONS

Extended European Search Report corresponding to European Application No. EP 11 86 7836, mailed Nov. 6, 2014.
Muller et al.: "Improving HSDPA link adaptation by considering the age of channel quality feedback information", Vehicular Technology Conference, 2005. VTC-2005-Fall. 2005 IEEE $62^{nd}$ Dallas, TX, USA Sep. 25-28, 2005 Vol. 3, pp. 1643-1647, XP010878723.
Nokia et al.: "CQI Trigger Mechanism", 3GPP DRAFT; R1-074353, $3^{rd}$ Generationpartnership Project (3GPP), Mobile Competence Centre; 650, Route Des Lucioles; F-06921 Sophia-Antipolis Cedex; France, vol. RAN WG1, No. Shanghai, China; Oct. 2, 2007, XP050107869.
Interdigital Communications et al: "Procedures for collisions between periodic and aperiodic CQI/PMI/RI reports and Draft CR to 36.213" 3GPP DRAFT; R1-082523, $3^{rd}$ Generation Partnership Project (3GPP), Mobile Competence Centre; 650, Route Des Lucioles; F-06921 Sophia-Antipolis Cedex; France, vol. RAN WG1, No. Warsaw, Poland; Jun. 26, 2008, XP050110788.
International Search Report, PCT/SE2011/050741, Feb. 29, 2012.
Written Opinion of the International Searching Authority, PCT/SE2011/050741, Feb. 29, 2012.

* cited by examiner

METHOD AND NODE FOR SCHEDULING IN A WIRELESS COMMUNICATIONS NETWORK

CROSS REFERENCE TO RELATED APPLICATION

This application is a 35 U.S.C. §371 national stage application of PCT International Application No. PCT/SE2011/050741, filed on 15 Jun. 2011, the disclosure and content of which is incorporated by reference herein in its entirety. The above-referenced PCT International Application was published in the English language as International Publication No. WO 2012/173535 A1 on 20 Dec. 2012.

TECHNICAL FIELD

The present disclosure relates to a method in a network node and to the network node itself in a wireless communications network. In particular, it relates to control of scheduling of radio resources to a UE located in the wireless communications network.

BACKGROUND

Wireless communication systems of today have increased demands on supporting higher peak rates and capacity. One of the most popular techniques for achieving this is the utilization of multiple antennas at the transmitter and/or receiver side. How and for which purpose these antennas are utilized differs based among other things on operating channel conditions. For instance, multiple antennas can be utilized to transmit different data streams on the same time/frequency resource in case the Signal to Interference and Noise Ratio (SINR) is high enough and the channels between the different antennas are uncorrelated enough. Another possible utilization of multiple antennas is to transmit different redundant versions of the same information e.g. as in done in the Alamouti scheme, and thereby increasing diversity.

Based on the type of information available at the transmitter, two generic modes of Multiple-Input Multiple-Output (MIMO) operation, which is a transmission scheme between a transmitter and a receiver both equipped with multiple antennas, can be distinguished:

Open Loop (OL) Transmission

OL-MIMO refers to the case where the Precoding Matrix Information (PMI) can not be obtained at the transmitter, or can be obtained with a very low accuracy or short life, e.g. in case of User Equipments (UEs) moving at high speed. OL-MIMO is also referred to as channel independent transmission.

Closed Loop (CL) Transmission

CL-MIMO refers to the case where the transmitter has knowledge of the PMI and Rank Indicator (RI) so that it can choose the transmission parameters in a way that suits the operating channel conditions and further improve the system's performance. In addition to Closed Loop Spatial Multiplexing (CLSM), CL-MIMO also allows utilizing the rank 1 Tx diversity mode, i.e. based on Alamouti coding (e.g. in case the obtained PMI/RI information expired or has a low accuracy). CL-MIMO is also referred to as channel dependent transmission.

In Long Term Evolution (LTE) systems/networks, both CL-MIMO and OL-MIMO will be utilized and configured at a Radio Resource Control (RRC)-level. As such, a switch between CL and OL is not very flexible as it requires a reconfiguration of the UE's connection. On the other hand, if a UE is in CL-mode, it is flexible and straightforward to choose between the different transmissions schemes within i.e. Spatial Multiplexing (SM), precoding-based or Tx diversity. The UE knows which scheme the Base Station (BS) is utilizing by simply examining signals from the BS e.g. the downlink assignment which is obtained from the Downlink Control Information (DCI) in LTE.

In order to utilize CL MIMO, Channel State Information (CSI) of the downlink channel has to be reported from the UE to the BS (eNodeB, eNB). The CSI consists of any combination of Channel Quality Indicator (CQI), PMI and/or RI. In an LTE system/network, the feedback of this information from the UE to the BS can occur on two different channels with two different configurations.

1. Periodic CSI reporting on Physical Uplink Control Channel (PUCCH) which is the LTE uplink physical channel carrying uplink control information including Channel Quality Indicators (CQI), Hybrid Automatic Retransmission reQuest (HARQ) ACKnowledgment/Negative ACKnowledgment (ACK/NACK) and uplink scheduling requests.

The CSI report, periodically reported as mentioned above, typically consists of wideband PMI measures (mean value).

2. Aperiodic CSI reporting on Physical Uplink Shared Channel (PUSCH) which is the LTE uplink physical channel carrying scheduled data traffic, and control signalling if some is required to be transmitted in the same sub-frame.

The CSI report may consist of either wideband PMI with sub-band CQI, or sub-band PMI with wideband CQI.

By wideband PMI, as mentioned above, it is normally meant that a measurement is obtained by averaging over the whole band. This is as opposed to a sub-band measurement where the measurement has a finer granularity and is obtained over a specific part of the bandwidth. The trade-off is of course complexity vs accuracy.

Figure 1:
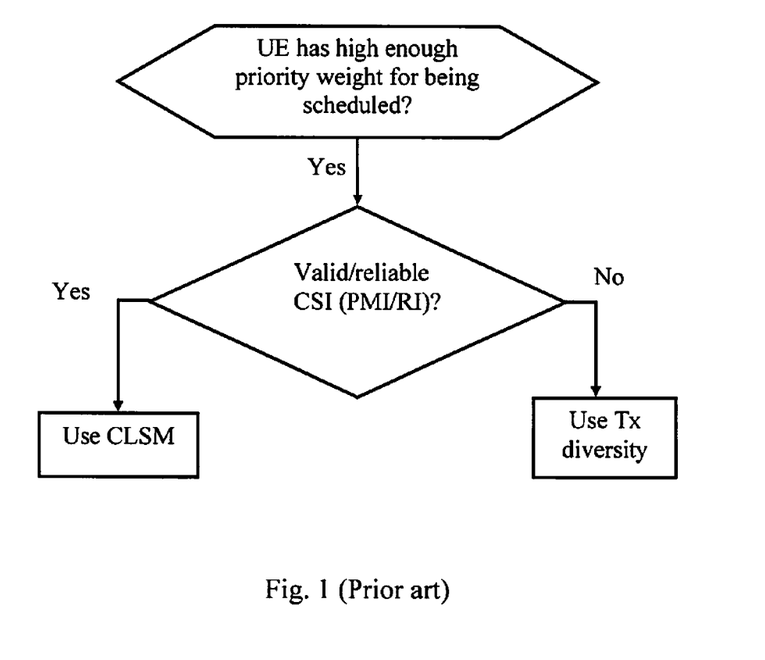
FIG. 1 is a flowchart illustrating a procedure of scheduling radio resource to a UE according to prior art.

The main benefit of utilizing CL transmissions is the utilization of detailed channel knowledge, e.g. PMI, RI, to better suit the transmission parameters to the operating channel conditions. However, it is known that errors and/or delays in the reported CSI would lead to detrimental effects to the system's performance as evidenced. However, such a problem has not been thoroughly tackled from a multi-antenna closed loop perspective. One can typically assume that the BS will utilize the reported CSI by the UE when scheduling a transmission. However, the BS doesn't consider if this CSI is old, and how to proceed in this case. The most straightforward approach is that if the PMI becomes old, based on some specific criteria such as the UE speed, the BS could utilize Tx diversity instead of CLSM to increase the chances of correct reception at the UE. However, utilizing Tx diversity might be too conservative i.e. in case the channel conditions are good, although the CSI became unreliable/outdated (not valid), and would lead to a lower peak rate than what a UE could have otherwise achieved. On the other hand, utilizing CLSM might be too aggressive, leading to reception errors and retransmissions, which would also decrease the bit rate. This is illustrated by FIG. 1, according to which the BS determines firstly if the UE has enough priority weight for being scheduled and when so being the case determining whether the reported CSI is reliable/valid or not. When the CSI is valid the BS then proceeds by selecting CLSM for transmission to the UE and if the CSI is determined not to be reliable/valid the BS may choose to transmit using Tx diversity.

In order to keep track of the channel variations, UEs regularly send wideband PMI reports on PUCCH, every T ms. The smaller T is, the more updated information the BS has. However, in order not to deplete the PUCCH capacity by excessively utilizing it for PMI feedback, T is typically configured to a value that is larger than the channel coherence time. As such, simply relying on the fact that a certain CSI report would be valid until the next CSI report is received does not hold, at least not for all UEs in the system. This is further illustrated by FIG. 2 in which the BS might choose a transmission scheme for a UE configured in CL MIMO from a time-domain perspective. Once a UE has high enough priority weight to be scheduled, e.g. a determined time period has elapsed making the UE highly prioritized, the BS examines the validity of this UE's PMI/RI information i.e. if the CSI is reported during time t+x.

Figure 2:
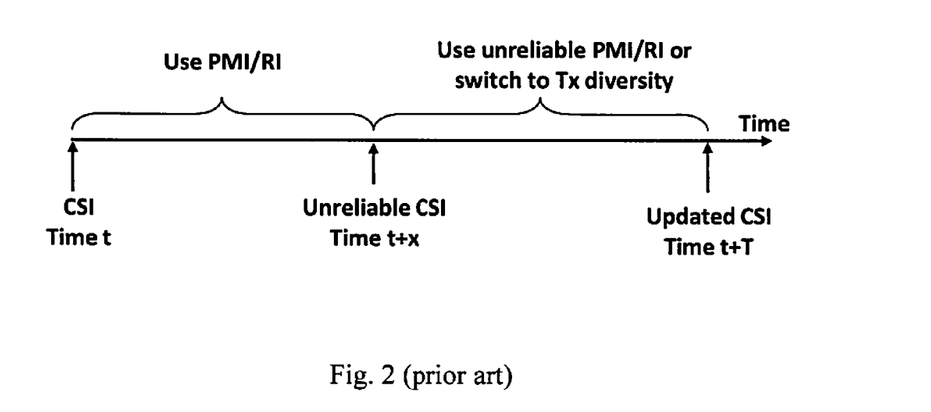
FIG. 2 is a time based illustration of how scheduling of radio resources to a UE are deployed in a prior art wireless communications network.

As can be seen from the FIG. 2, a first event occurs at time t and represents a reception at the BS of a CSI report from the UE. The validity can be a function of e.g. the UE speed (i.e. high speed UEs have PMIs with shorter validity period compared to low speed UEs). A second event occurs at time t+x and represents the time where the previously received CSI report becomes outdated, thus unreliable to utilize when scheduling the UE and/or selecting for example its CL MIMO transmission mode as the case for LTE. In case the PMI/RI is valid that is only before time t+x since the last reporting, it will be used when deciding on a proper transmission scheme for that UE. Otherwise, i.e. the CSI was reported before a time t+T, the BS might revert to Tx diversity (or utilize CLSM with the outdated PMI/RI). Third is represented in the figure as a third event which occurs at time t+T and which represents the reception at the BS of an updated CSI report from the UE. One can deduce that the longer the invalidity period is, the more 'wild guesses' the BS has to do about proper transmit scheme selection. Keeping in mind that it is not desirable to decrease the period over which periodic CSI reporting happens, it is desirable to avoid the aforementioned limitation.

Concerning aperiodic CSI reporting on PUSCH, the UE can even append this information i.e. the CSI report, to its uplink data transmission, in case it has data to transmit in the uplink. However, the scheduling of a user for downlink is (in principle) independent of its uplink data reception and is based on the UE's downlink scheduling priority weight. As such, a UE is not guaranteed to be scheduled in downlink directly after it receives a CSI update on PUSCH, especially in the presence of several active users in the cell. What would accentuate such a limitation is the processing capability that typically means that in a practical system, only a limited number of scheduling entities can be scheduled every Transmission Time Interval (TTI).

In short, one main limitation is that the BS will at times possess unreliable/outdated CSI (e.g. PMI/RI) information for a CL-configured UE, leading the BS to making too aggressive/conservative choices.

SUMMARY

It is therefore an object to provide a network node and a method therein, for improved control of scheduling of radio resources to UEs in a wireless communications network/system.

In an example of embodiments, the object is achieved by a method in a network node for scheduling radio resources, or controlling the scheduling of radio resources, to a UE in a wireless communications network wherein the UE is being served by the network node and is determined to have enough priority weight for being scheduled in downlink. The method comprises retrieving UE Channel State Information (CSI) and determining whether the retrieved CSI is unreliable, and when so being the case, retrieving a Scheduling Delay Time (SDT) representing a time for which the network node is allowed to delay a scheduling of radio resources to the UE. The method then comprises determining whether an updated CSI is due to be reported during the retrieved SDT, and, scheduling radio resources to the UE based on a result from the determining whether an updated CSI is due to be reported during the retrieved SDT, or not.

In an example of embodiments, there is provided a network node for scheduling radio resources to a UE in a wireless communications network wherein the UE is being served by the network node and is determined to have enough priority weight for being scheduled in downlink. The network node comprises a transceiver circuit and a processor circuit. The transceiver circuit is configured to retrieve Channel State Information (CSI) for the UE. The processor circuit is configured to determine whether the retrieved CSI is unreliable, and when so being the case to retrieve a Scheduling Delay Time (SDT) representing a time for which the network node is allowed to delay a scheduling of radio resources to the UE. The processor circuit is further configured to determine whether an updated CSI is due to be reported during the retrieved SDT, and, to schedule radio resources to the UE based on whether or not an updated CSI is due to be reported during the retrieved SDT.

An advantage achieved by at least one of the above mentioned embodiments is that the BS is allowed to use more reliable/updated CSI information when scheduling a UE.

Other advantages achieved by at least some of the embodiments disclosed herein are a result in better error performance in the wireless communications network, at least compared to when a network node simply uses an unreliable CSI, and in higher peak rate at least compared to when the network node simply reverts to Tx diversity.

Yet an advantage is achieved by at least some of the embodiments disclosed herein is an increase of capacity in a wireless communications network.

Other objectives, advantages and novel features of aspects of the present disclosure will become apparent from the following detailed description of embodiments and aspects.

BRIEF DESCRIPTION OF THE DRAWINGS

The embodiments are described in more detail with reference to attached drawings illustrating exemplary embodiments and in which.

DETAILED DESCRIPTION

Figure 3:
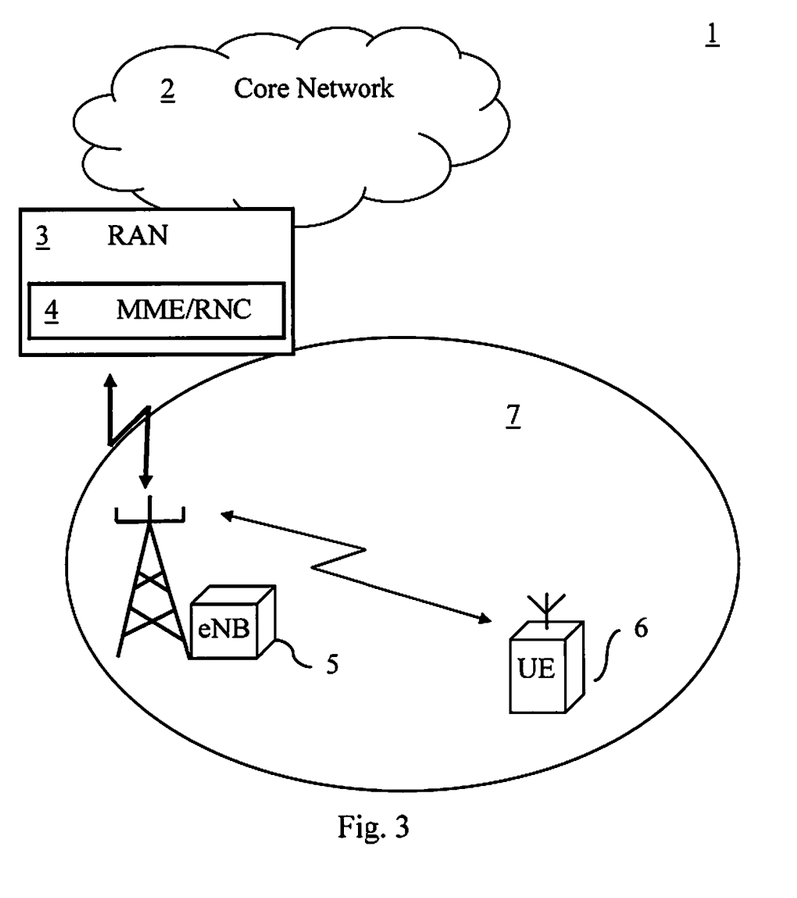
FIG. 3 illustrates a basic scenario of wireless communications network deployment in which the present embodiments may be implemented.
Figure 4:
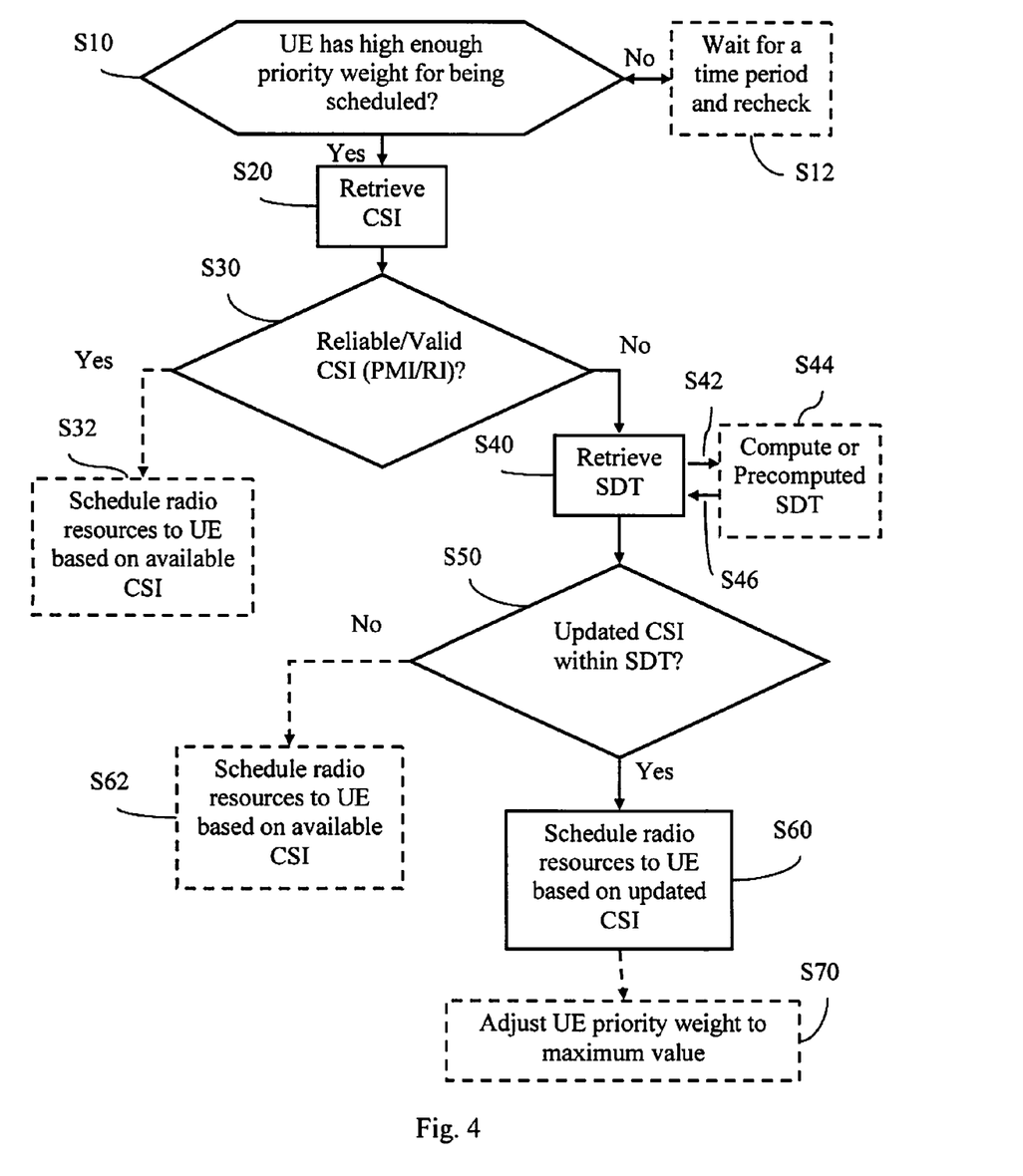
FIG. 4 is a flowchart depicting examples of embodiments of a method in a radio network node.

FIG. 3 illustrates a basic scenario of wireless communications network deployment. According to the figure a wireless communications network 1, or system, comprises a core network 2 and an access network 3, also denoted Radio Access Network (RAN). The RAN may comprise a Mobility Management Entity 4 (MME) and other network nodes in case of being a LTE RAN. The RAN may also comprise a Radio Network Controller 4 (RNC) and other network nodes in case of being a WCDMA RAN. The RAN 3 may also comprise or control one or more Base Stations 5 (BSs), in FIG. 3 only one BS is illustrated for simplicity. The BS 5 may in turn be serving one or more UEs 6 located in one or more cells 7. Note again that only one UE and one cell are used in FIG. 3 for simplicity of explanation. The BS 5 may be a BS of an LTE system, i.e. an eNodeB, as illustrated in the figure. FIG. 4 illustrates a wireless communications network in which embodiments of the present disclosure may be implemented.

FIG. 4 is a flowchart depicting examples of embodiments of a method in a radio network node according to the present disclosure, which method is for scheduling radio resources to a User Equipment (UE) in a wireless communications network similar to the one mentioned above i.e. wireless communications network 1, or an LTE system. The UE, e.g. UE 6, is being served by the network node and is determined S10 to have enough priority weight for being scheduled in downlink. This determination is typically time based i.e. the UE gets a higher priority weight depending on a time the UE has been waiting. If the UE has not enough priority weight the method then comprises a step of waiting S12 for a time period and then rechecking the priority weight of the UE. This is an optional step which may exist in combination with any of the disclosed embodiments and therefore marked with dashed lines in FIG. 4. Additionally, the method may be for scheduling radio resources to a UE configured in closed-loop Multiple Input Multiple Output, MIMO.

Following above, the method comprises a first step of retrieving S20 UE Channel State Information (CSI). The CSI may be requested directly from the UE or from another network node, e.g. a operation and maintenance node or another network node, or retrieved from an internal storage/memory in the network node. The UE CSI may comprise one or more of the following: a Channel Quality Indicator (CQI); a Precoding Matrix Information (PMI); and, a Rank Indicator (RI).

After retrieving the CSI for the UE the method further comprises a step of determining S30 whether the retrieved CSI is unreliable, or not. When the retrieved UE CSI is determined to be reliable/valid the method then comprises a step of scheduling S32 radio resources to the UE based on the CSI i.e. the available CSI. According to an embodiment, the method may comprise scheduling a CLSM transmission for the UE. This is however also an optional step which may exist in combination with any of the disclosed embodiments and therefore marked with dashed lines in FIG. 4.

Following above, in case of the retrieved CSI is determined not to be reliable i.e. outdated or not valid, e.g. due to UE speed or time passed since reporting, the method comprises a step of retrieving/computing S40 a Scheduling Delay Time (SDT) representing a time for which the network node is allowed to delay a scheduling of radio resources to the UE. This is followed by the steps of: determining S50 whether an updated CSI is due to be reported during the retrieved SDT; and, scheduling S60 radio resources to the UE based on a result from the determining S50 whether an updated CSI is due to be reported during the retrieved SDT. The scheduling S60 of radio resources to the UE may comprise scheduling radio resource based on the updated CSI when it is determined that the updated CSI is due to be reported during the retrieved SDT and wherein the updated CSI is received during the SDT. However, when it is determined that the updated CSI is not due to be reported, the method according to the flowchart of FIG. 4 illustrates an alternative (optional) step of scheduling radio resource to the UE based on the available CSI i.e. the retrieved CSI. Again the scheduling decision may also, or alternatively, be to use CLSM as a transmission mode or Tx diversity.

According to an embodiment, the retrieving S40 of the SDT may comprise sending S42 a request for a pre-computed S44 SDT or for the SDT to be computed S44 and receiving S46 the SDT in response. These are further optional steps which may exist in combination with any of the herein disclosed embodiments and are therefore marked with dashed lines in FIG. 4.

According to yet an embodiment, the SDT may be computed based on Quality of Service (QoS) requirements of the UE or on a quality of service class identifier. According to this embodiment an aim is taken towards exploiting an elastic nature and delay tolerance of a significant part of data traffic in order to utilize more updated and accurate estimates of the CSI. Based for example on the QoS nature of the downlink data which may be further obtained from the QoS class identifier, QCI, the network node which may be a BS is able to determine whether a certain UE's scheduling may be further delayed or not.

According to further embodiments, the SDT may be internally computed within the network node or at another network node and retrieved on demand or upon request. The computing may also be a part of the retrieving S40 itself.

According to a further embodiment, which may be combined with any other embodiment disclosed herein, a step is disclosed of adjusting/setting S70 the priority weight for scheduling of radio resources to a UE (postponed UE) to the maximum value as soon as its updated CSI is received. The adjusting/setting is performed in order to avoid further delaying of the scheduling of radio resources to the UE. Sometimes the scheduling of resources to the UE is simply denoted as scheduling the UE. In case the SDT is shorter than the time T for obtaining an updated CSI, the network node, or BS or eNodeB, simply utilizes Tx diversity as one alternative, or just utilizes the available outdated PMI/RI for a CLSM transmission, as mentioned earlier.

Figure 5:
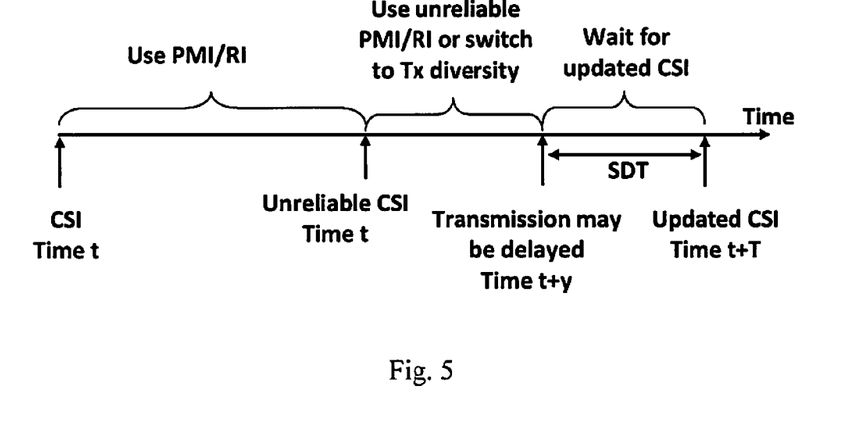
FIG. 5 is a time based illustration of how scheduling of radio resources to a UE are deployed according to embodiments disclosed herein.

FIG. 5 is another time based illustration of how scheduling of radio resources to a UE are deployed according to any or at least some of the above embodiments mentioned in relation to the description of FIG. 4. According to FIG. 5, a first event occurs at time t and represents a time of reception at the network node e.g. the BS, of a CSI report from the UE. According to this illustration only the PMI/RI values are of interest, and not the CQI, since this illustration mainly targets a CL MIMO case. FIG. 4 also discloses a second event which occurs at time t+x and represents the time where a previously (last reported) received CSI report becomes outdated, thus unreliable to utilize when scheduling radio resources or selecting a transmission scheme to the UE e.g. selecting a CL MIMO transmission mode. Also disclosed is third event which occurs at time t+y and represents the time where the network node may safely, i.e. without risking of not fulfilling QoS requirements of the UE in question, delay the transmission of a certain UE until its updated CSI, i.e. based on the periodic CSI transmissions, is received at the network node. A fourth event occurs at a time t+T and represents the reception at the network node of an updated CSI report from the UE.

It is important to note that in some scenarios, an updated CSI report may be received before the previously received CSI becomes outdated and therefore unreliable. It could also be the case that, based on a QoS required by the UE, the third event may be reached before the second event i.e. the transmission of the UE may be delayed without having to go through an unreliable CSI period. This would represent an ideal scenario for the disclosed embodiments as they manage to almost completely eliminate an uncertainty at the network node side.

Between time instants t and t+x, the network node e.g. the BS, has reliable CSI and may use this information when scheduling a UE and for example selecting the CL MIMO transmission mode. Between time instants t+x and t+y, the network node has outdated/unreliable CSI and would most probably revert to utilizing the robust Tx diversity scheme, but could as well opt to utilize the unreliable CSI it has. Either way, the network node is simply either opting for a robust but probably less efficient transmission scheme, when using Tx diversity, or is 'guessing' as it is not basing its choice on updated/reliable information. Between time instants t+y and t+T, the network node may delay the scheduling of the UE until it has received its updated CSI. This would result in the UE being scheduled and allocated a transmission mode that most probably suits its channel conditions better.

One can see from FIG. 5 that a main merit is to decrease an 'uncertainty time' at the network node or BS i.e. a time period where the CSI of a UE to be scheduled is unreliable (outdated/inaccurate), when it comes to selecting a proper transmission scheme. For instance, elastic traffic with very loose delay constraints would have a very large SDT, which means in essence that the uncertainty time at the network node for such traffic is effectively reduced to near zero. Also the use of a computed SDT may be applied even to delay-sensitive data since even delay-sensitive data could have some SDT, albeit small one.

Another important observation is that one might have an impression that although some of the earlier mentioned embodiments may increase the system's capacity they could sometimes lead to a decrease in (peak) bit rate i.e. in terms of bits per second. This is since UEs having outdated CSI are forced to wait a longer time for receiving information due to postponed scheduling of radio resources. However, this is not necessarily always correct since many of the mentioned embodiments would lead to a lower probability of incorrect reception, due to utilizing updated CSI, and even a transmission with a higher rank i.e. in case the network node would simply switch to Tx diversity as an alternative in case of outdated CSI. Another factor that is important to keep in mind is system load or load on the wireless communications network 1. For example, in the presence of multiple users, the network node e.g. BS, would be able to schedule other UEs when it delays scheduling a UE with outdated CSI for a time period.

Figure 6:
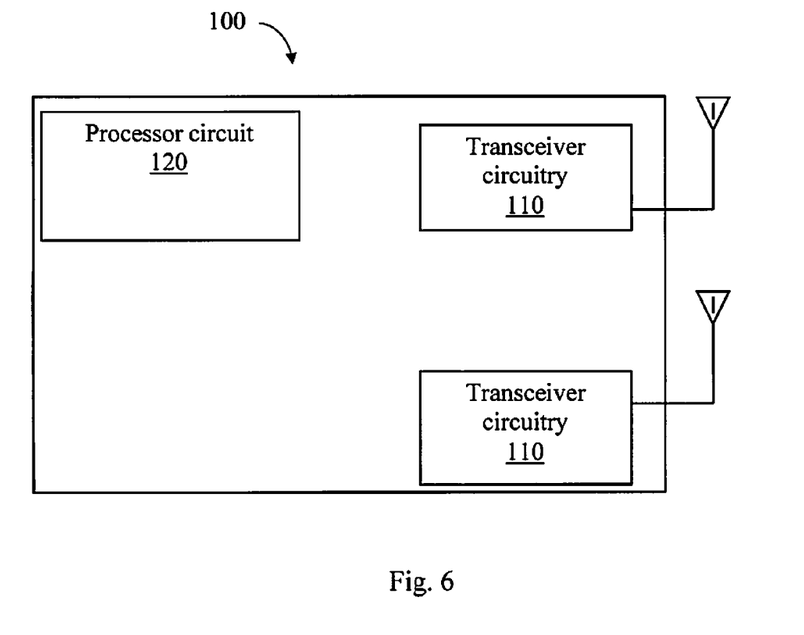
FIG. 6 is a schematic block diagram illustrating an example of embodiments of the network node.

FIG. 6 is a schematic block diagram illustrating an example of embodiments of the network node mentioned in relation to any of the above embodiments. According to the figure, the network node 100 comprises at least one transceiver circuit 110 (or two as in the figure) and a processor circuit 120. Many transceivers and antennas in any combinations may exist both at the network node and the UE in case of a MIMO system. The network node 100 may comprise many other parts which are not shown in this illustration for simplicity, such as filters, modulators, CPU etc. The network node 100 may be the BS 5 illustrated in FIG. 3, and may further be a NodeB, an eNodeB5, a BTS or nay other node with similar functionality. According to other embodiments the network node 100 is an MME 4, a RNC 4 or any other RAN 3 network node, such as an operation and maintenance node or any other service node. The network node 100 is used for scheduling radio resources to a UE in a wireless communications network, wherein the UE is being served (located in a served cell) by the network node and is determined to have enough priority weight for being scheduled in downlink. It may also be seen as the network node 100 controls the scheduling of the UE or controlling the scheduling of radio resources on one or more bearers to the UE.

Figure 7:
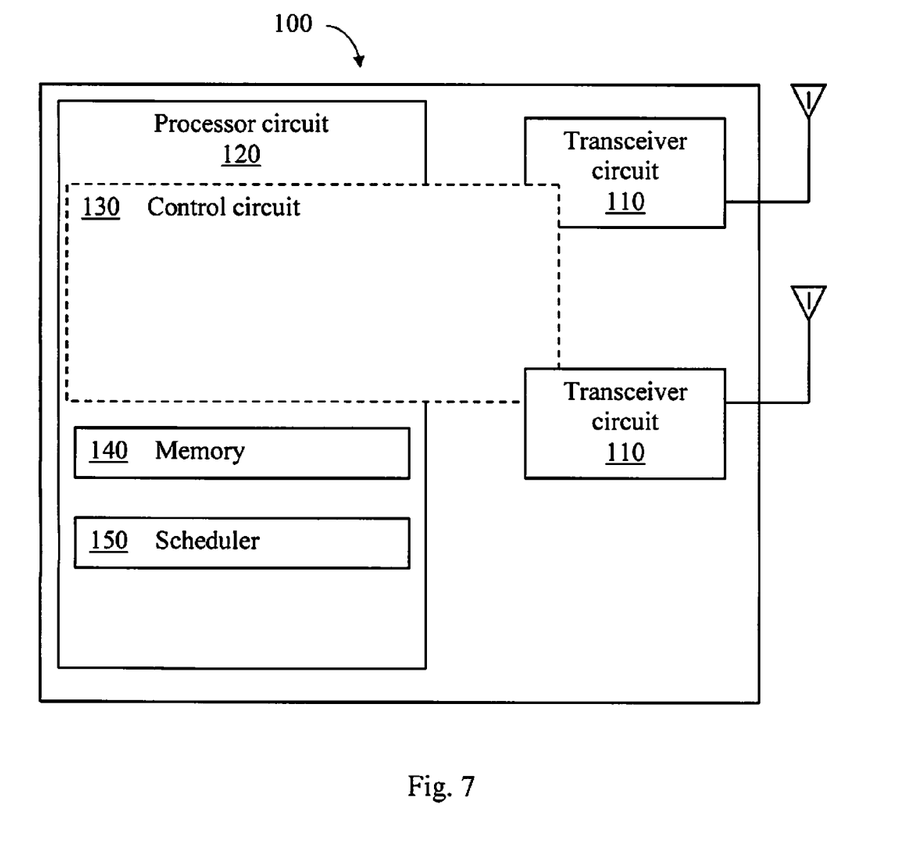
FIG. 7 is a schematic block diagram illustrating further examples of embodiments of the network node.

The transceiver circuit 110 mentioned above is configured to retrieve CSI for the UE directly from the UE or via one more other network nodes e.g. BSs or MME, or internally from a memory/storage in the network node 100, see for example FIG. 7 memory 140.

Continuing with the description of FIG. 6, the processor circuit 120 is configured to determine whether the retrieved CSI e.g. CQI, PMI and/or RI, is unreliable or reliable. When the CSI is determined to be unreliable the processor circuit is further configured to retrieve a SDT representing a time period for which the network node is allowed to delay a scheduling of radio resources to the UE. The SDT may be computed in advance for certain UEs or computed upon request. The SDT may be computed externally at another network node or internally in the network node 100 by aid of a control circuit 130 e.g. a computing and determining unit. The control circuit 130 is marked with dashed lines to illustrate that it may be comprised in any other circuit or part of the network node 100, or as a separate circuit/unit. The processor circuit 120 is then configured to determine whether an updated CSI is due to be reported during the retrieved SDT, and to schedule radio resources to the UE based on whether or not an updated CSI is due to be reported during the retrieved SDT.

Following above, according to an embodiment, the processor circuit 120 is configured to schedule radio resource based on the updated CSI when it is determined that the updated CSI is due to be reported during the retrieved SDT and wherein the updated CSI is received during the retrieved SDT. The processor circuit 120 controls the scheduling and controls when to perform the scheduling of radio resources basically on whether an updated CSI is expected within the SDT or not.

According to further embodiments, the processor circuit 120 may comprise a scheduler 150 or functionalities of a scheduler as seen from FIG. 7, or may be in close cooperation with a scheduler performing the scheduling of radio resources to the UE. The processor circuit 120 may also be configured to adjust the priority weight of the UE to a maximum priority weight enabling a highest scheduling prioritization of the UE so that a newly received updated CSI is used immediately and not delayed and thereby becoming outdated. For example, during the delaying of the scheduling in order to receive the updated CSI the UE might end up not having the highest priority weight for being scheduled and therefore must wait for its turn.

Further, it is to be noted that some of the described circuits/circuitries 110-150 comprised within the network node 100 are to be regarded as separate logical entities but not with necessity separate physical entities.

The method(s) in FIG. 4 is/are for use in the network node (5, 100) (or in a macro BS, an MME, an O&M etc), together with computer program code for performing the functions of the present method(s). Thus a computer program product, comprising instructions for performing the method may assist, when the computer program product is loaded into or run in the network node 100.

The computer program product mentioned above may be provided for instance in the form of a data carrier carrying computer program code for performing the method in a network node (5, 100) when being loaded or run on the network node (5, 100). The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server or in a network node and downloadable to the network node (5, 100) remotely, e.g. over an Internet or an intranet connection.

When using the formulation "comprise" or "comprising" it is to be interpreted as non-limiting, i.e. meaning "consist at least of". The present invention is not limited to the above described preferred embodiments. The term configured to may be equally exchangeable with being adapted to and is considered to have the same meaning. Various alternatives, modifications and equivalents may be used. Therefore, the above embodiments are not to be taken as limiting the scope of the present invention, which is defined by the appending claims.

The invention claimed is:

1. A method in a network node for scheduling radio resources to a User Equipment, UE, in a wireless communications network, and wherein the UE is being served by the network node and is determined to have enough priority weight for being scheduled in downlink, the method comprises:
    retrieving Channel State Information, CSI, for the UE; and
    determining whether the retrieved CSI for the UE is invalid, wherein the CSI being invalid is a function of speed of the UE; and
    in response to determining the retrieved CSI is invalid:
        retrieving a Scheduling Delay Time, SDT, representing a time for which the network node is allowed to delay a scheduling of radio resources to the UE;
        determining whether an updated CSI is due to be reported during the retrieved SDT; and,
        scheduling radio resources to the UE based on the updated CSI when it is determined that the updated CSI is due to be reported during the retrieved SDT, and wherein the updated CSI is received during the retrieved SDT,
    wherein the method is for scheduling radio resources to the UE configured in closed-loop Multiple Input Multiple Output, MIMO.

2. The method according to claim 1, wherein the CSI for the UE comprises one or more of the following: channel quality indicator; precoding matrix information; and rank indicator.

3. The method according to claim 1, wherein scheduling radio resources to the UE comprises scheduling radio resource based on the retrieved CSI when it is determined that the updated CSI is not due to be reported during the retrieved SDT.

4. The method according to claim 1, wherein retrieving the SDT comprises retrieving a SDT computed based on quality of service requirements of the UE.

5. The method according to claim 1, wherein retrieving the SDT comprises retrieving a SDT computed based on a quality of service class identifier.

6. The method according to claim 1, wherein retrieving the SDT comprises sending a request for a pre-computed SDT or for a SDT to be computed and receiving the SDT in response.

7. The method according to claim 1, wherein the SDT is computed internally within the network node or externally at another network node.

8. The method according to claim 1, wherein the method further comprises adjusting the priority weight of the UE to a maximum priority weight enabling a highest scheduling prioritization of the UE.

9. A network node for scheduling radio resources to a User Equipment, UE, in a wireless communications network, wherein the UE is being served by the network node and is determined to have enough priority weight for being scheduled in downlink, the network node comprising:
    a. a transceiver circuit configured to retrieve Channel State Information, CSI, for the UE; and
    b. a processor circuit configured to determine whether the retrieved CSI is invalid, wherein the CSI being invalid is a function of speed of the UE; and in response to determining the retrieved CSI is invalid:
        i. retrieve a Scheduling Delay Time, SDT, representing a time for which the network node is allowed to delay a scheduling of radio resources to the UE;
        ii. determine whether an updated CSI is due to be reported during the retrieved SDT; and,
        iii. schedule radio resources to the UE based on the updated CSI when it is determined that the updated CSI is due to be reported during the retrieved SDT, and wherein the updated CSI is received during the retrieved SDT,
    wherein the processor circuit is configured to schedule radio resources to a UE determined to be configured in closed-loop Multiple Input Multiple Output, MIMO.

10. The network node of claim 9, wherein the processor circuit is configured to operate as a scheduler or to control a scheduler which performs the scheduling of radio resources to the UE.

11. The network node according to claim 9, wherein the CSI retrieved by the processor circuit for the UE comprises one or more of the following: channel quality indicator; precoding matrix information; and rank indicator.

12. The network node according to claim 9, wherein the processor circuit is configured to schedule radio resource based on the retrieved CSI when it is determined that the updated CSI is not due to be reported during the retrieved SDT.

13. The network node according to claim 9, wherein the SDT is computed based on quality of service requirements of the UE or based on a quality of service class identifier.

14. The network node according to claim 9, wherein the processor circuit is configured to comprise a memory for storing a pre-computed SDT, and wherein the processor circuit is configured to request, as part of the retrieving, the pre-computed SDT or a SDT to be computed and receive the SDT in response.

15. The network node according to claim 9, wherein the processor circuit is further configured to determine if the CSI is outdated or not valid due to UE speed or time passed since reporting comprise a memory for storing a pre-computed SDT.

16. The network node according to claim 9, wherein the processor circuit is configured to adjust the priority weight of the UE to a maximum priority weight enabling a highest scheduling prioritization of the UE.

\* \* \* \* \*